(12) United States Patent
Sperber et al.

(10) Patent No.: US 6,209,406 B1
(45) Date of Patent: Apr. 3, 2001

(54) TOOTHED GEAR TRANSMISSION HAVING TWO PARTIAL TRANSMISSIONS DISPOSED PARALLEL TO EACH OTHER IN THE POWER FLOW

(75) Inventors: Ralf Sperber, Wendlingen; Ernst Tscheplak, Weinstadt; Günter Wörner, Kernen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/472,397

(22) Filed: Dec. 27, 1999

(30) Foreign Application Priority Data

Dec. 24, 1909 (DE) ............................................. 198 60 250
Apr. 24, 1999 (DE) ............................................. 199 18 734

(51) Int. Cl.⁷ ....................................................... F16H 3/08
(52) U.S. Cl. .......................................................... 74/330
(58) Field of Search ...................................... 74/330, 331

(56) References Cited

U.S. PATENT DOCUMENTS

| 3,817,123 | 6/1974 | Whateley et al. . |
| 4,658,663 | 4/1987 | Hiraiwa . |
| 4,823,628 | 4/1989 | Hiraiwa . |

FOREIGN PATENT DOCUMENTS

| 31 31 139 | 2/1983 | (DE) . |
| 35 46 454 | 2/1987 | (DE) . |
| 38 12 327 | 6/1989 | (DE) . |
| 42 40 762 | 6/1993 | (DE) . |
| 43 30 170 | 3/1995 | (DE) . |
| 197 08 528 | 9/1997 | (DE) . |
| 2103316 * | 2/1983 | (GB) .................................. 74/331 |
| 2103317 * | 2/1983 | (GB) .................................. 74/331 |

* cited by examiner

Primary Examiner—Dirk Wright
(74) Attorney, Agent, or Firm—Kenyon & Kenyon

(57) ABSTRACT

The invention is based on a toothed gear transmission in which an input shaft is connected to an output shaft by a first and a second partial transmission, which are disposed parallel to each other in the power flow and which both have a frictionally engaged load shifting clutch and an intermediate shaft, in which each of the intermediate shafts can be effectively connected to the input shaft through the load shifting clutch, and with at least one first transmission constant.

It is proposed that for starting, the first load shifting clutch can be placed in effective connection with the output shaft through a transmission constant and the second load shifting clutch can be placed in effective connection with the output shaft through a transmission constant, each at a gear ratio of the lowest gear speed.

21 Claims, 6 Drawing Sheets

| Z | Q | GS | K2 | | | | K1 | | | | K2 | |
|---|---|---|---|---|---|---|---|---|---|---|---|---|
| | | | IV₁ | VI | III₂ | IV₃ | V | IV₂ | III₁ | I₁ | II | I₂ |
| K2 | IV₁ | S1(C2), S6 | | | | | X | X | X | X | | |
| | VI | S1(C2), S4, S5(ZIV/VI) | | | | | X | X | – | – | | |
| | III₂ | S1(C1), S5(ZIII/IV) | | | | | X | – | X | – | | |
| | IV₃ | S1(C1), S5(ZIV/VI) | | | | | X | X | – | – | | |
| K1 | V | S2(ZIV/VI) | X | X | X | X | | | | | X | X |
| | IV₂ | S2(C1), S5(ZIV/VI) | X | X | – | X | | | | | X | – |
| | III₁ | S2(C1), S5(ZIII/IV) | X | – | X | – | | | | | X | – |
| | I₁ | S2(C1), S4, S3(ZI/II) | X | – | – | – | | | | | X | X |
| K2 | II | S1(C2), S3(ZI/II) | | | | | X | X | X | X | | |
| | I₂ | S1(C1), S4, S3(ZI/II) | | | | | X | – | – | X | | |

Fig. 6

TOOTHED GEAR TRANSMISSION HAVING TWO PARTIAL TRANSMISSIONS DISPOSED PARALLEL TO EACH OTHER IN THE POWER FLOW

FIELD OF THE INVENTION

The invention relates to a toothed gear transmission having two partial transmissions disposed parallel to each other in the power flow as well as a process for shifting such toothed gear transmissions.

BACKGROUND

The manual transmissions with a friction clutch which are usually used in motor vehicles are simple and sturdy, but they have the disadvantage that an interruption in tractive power occurs during gear changes. Conventional automatic transmissions with torque converters avoid an interruption of tractive power during gear changes, but due to the torque converter they are less efficient than manual transmissions. Moreover, they are heavier and more cost-intensive.

In toothed gear transmissions having two frictionally engaged load shifting clutches and two partial transmissions disposed parallel to each other in the power flow, it is possible to change gears under load, which is done with an overlap control of the load shifting clutches. This makes it possible to achieve an inexpensive automatic transmission having good efficiency. Generally speaking, the even gear speeds are allocated to one partial transmission and the odd gear speeds are allocated to the other partial transmission, so that shifting can be done sequentially under load, although individual gear speeds cannot be skipped without further action, so-called double upshifting or double downshifting.

A generic toothed gear transmission is known from U.S. Pat. No. 4,658,663. In the toothed gear transmission, an input shaft is connected to an output shaft through a first and a second partial transmission, which are disposed parallel to each other in the power flow and which both have a frictionally engaged load shifting clutch. The load shifting clutches can be used to connect concentrically arranged intermediate shafts of the partial transmissions with the input shaft. The intermediate shafts can be effectively connected with the output shaft through transmission constants, through a joint countershaft disposed parallel to the input shaft, and through toothed gear pairs. The toothed gear pairs for the forward gear speeds I, III, and IV, as well as the toothed gear pair for the reverse gear speed, belong to the first partial transmission. The fourth gear speed is designed as a direct gear speed and can be selected by engaging a shifting component between the output shaft and the intermediate shaft of the first partial transmission.

The second partial transmission comprises the toothed gear pairs of forward gear speeds II and V, as well as an additional toothed gear pair, whose gear ratio is equal to that of the third gear speed, whose toothed gear pair belongs to the first partial transmission. In the first partial transmission, a toothed gear clutch for the third gear speed and the direct clutch for the fourth gear speed are combined into a change clutch having a joint synchronizer sleeve, which can be coupled with an idler gear of the toothed gear pair for the third gear speed or with the output shaft.

The load shifting clutches of the partial transmissions are alternately allocated to the gear speeds. The first load shifting clutch of the first partial transmission is always used to start from the first gear speed, which causes greater wear to occur on it than on the second load shifting clutch.

SUMMARY OF THE INVENTION

The aim of the invention is to further develop a generic toothed gear transmission and in particular to achieve longer maintenance intervals, less wear, and greater security. It is fulfilled in accordance with the invention by the features of the independent claims. Additional embodiments are contained in the subclaims.

The invention is based on a toothed gear transmission in which an input shaft is connected to an output shaft by a first and a second partial transmission, which are disposed parallel to each other in the power flow. The partial transmissions each have a frictionally engaged load shifting clutch and an intermediate shaft, and each of the intermediate shafts can be effectively connected to the input shaft through the load shifting clutch. In addition, the toothed gear transmission has at least one first transmission constant.

It is proposed that for starting, the first load shifting clutch can be brought in effective connection with the output shaft through a transmission constant, and the second load shifting clutch can be brought in effective connection with the output shaft through a transmission constant having the gearing of the lowest gear speed. Both load shifting clutches can be used for the process of starting from the lowest or first gear speed. The stress resulting from the starting process can be distributed to both load shifting clutches. An excess temperature can be avoided in spite of inexpensive dimensioning, wear can be reduced, and maintenance intervals can be extended. Moreover, if one load shifting clutch fails, the second load shifting clutch can be used to start from the first gear speed, increasing mobility security. It is also possible to construct the load shifting clutches differently for different starting processes.

The solution in accordance with the invention can be used in a toothed gear transmission in which the intermediate shafts can be connected to an output shaft through at least one countershaft and through at least one toothed gear pair. In addition, the solution in accordance with the invention can also be used in a toothed gear transmission in which the intermediate shafts having at least one transmission constant are directly connected to at least one output shaft. Toothed gear transmissions with a countershaft are generally used in motor vehicles having rear-wheel drive, and toothed gear transmissions without countershafts are generally used in motor vehicles having front-wheel drive.

It is particularly advantageous for it to be possible to connect the first and the second load shifting clutches simultaneously to the output shaft with the gear ratio of the lowest gear speed. This allows the load shifting clutches to be dimensioned so they are particularly inexpensive and light.

The solution in accordance with the invention can be achieved by various embodiments appearing appropriate to those skilled in the art, for example with two equal transmission constants, where one transmission constant is allocated to the first intermediate shaft and one transmission constant is allocated to the second intermediate shaft, and where output to an output shaft can take place through the transmission constants, through at least one countershaft, and through a common toothed gear pair or through two equal toothed gear pairs, or where output can take place through two equal transmission constants directly onto at least one output shaft. Moreover, with different transmission constants it is possible to create two first gear speeds using different toothed gear pairs.

However, it is particularly advantageous for it to be possible to place at least the transmission constant allocated to the lowest gear speed in effective connection with the first and the second load shifting clutches. Both load shifting clutches can be connected to the output shaft through the same transmission constants and through the same toothed gear pair. Additional toothed gear pairs, weight, and construction space, as well as assembly effort and costs, can be saved, and greater efficiency can be achieved due to low weight and a low rotating mass. Moreover, the load shifting capabilities can be increased and, with a small number of toothed pairs, in addition to sequential shifting at least the most important double upshifts and double downshifts under load are made possible. Double upshifts and double downshifts are particularly necessary before and after a passing maneuver.

For various reasons, it may be useful to start from the second or an even higher gear speed instead of from first gear, for instance when slowly starting with a high-power internal combustion engine, when starting on slippery ground, on slopes, and/or when starting with little or no loaded weight, etc.

High stresses can occur on a load shifting clutch, particularly when starting from a higher gear speed. In order to avoid the resulting one-sided load and increased wear, it is advantageous for it to be possible to place the first load shifting clutch in effective connection with the output shaft through a transmission constant and the second load shifting clutch in effective connection with the output shaft through a transmission constant to start with a gear ratio of the second-lowest gear speed or of the second gear speed. It is fundamentally also conceivable that it be possible to connect both load shifting clutches to the output shaft to start with a gear ratio of an even higher gear speed.

If the first and second load shifting clutches can be simultaneously connected to the output shaft with the gear ratio of the second gear speed, the load shifting clutches can be dimensioned to be particularly inexpensive and light.

Simultaneous connection can advantageously be made possible in that a toothed gear of the first transmission constant is disposed on the first intermediate shaft and a toothed gear of at least a second transmission constant is disposed on the second intermediate shaft, and in that the first intermediate shaft can be placed in effective connection with the output shaft through a shifting component disposed between the toothed gears and through the second transmission constant. Additional toothed gear pairs, construction space, and costs can be saved.

If one toothed gear pair is allocated to the first and the second gear speed, one toothed gear pair can be used to start from the first and to start from the second gear speed, and it can be dimensioned accordingly. Moreover, particularly in a neutral position, the shifting components for the second gear speed can be preselected, so that after starting from the first gear speed it is possible to shift from the first to the second gear speed solely by an overlap control of the load shifting clutches. The change of gears from the first to the second gear speed, which usually occurs under high load, can be completed with particular comfort.

In one embodiment of the invention, it is proposed that it be possible to connect the intermediate shaft of the first partial transmission through the first transmission constant to a second countershaft which is parallel to the input shaft and which can be effectively connected to the output shaft through at least one toothed gear pair allocated to the first partial transmission, and that the first transmission constant can optionally be brought in effective connection with the first, the second, or both load shifting clutches. In addition to using both load shifting clutches to start from the first gear speed through the first transmission constant, it is possible to achieve an advantageous transmission arrangement having a small number of toothed gear pairs and a large number of load shifting capabilities in which, in addition to sequential shifting, the most important double upshifts and double downshifts are possible under load.

If the output shaft can be connected to the intermediate shaft of the first partial transmission by an engageable and disengageable shifting component to form a direct gear speed, three torque paths between the input and output shafts can advantageously be created by the connectable second countershaft. The torque paths can be used alternately and in particular can make possible double downshifting from the direct gear speed and double upshifting to the direct gear speed under load without an additional toothed gear pair.

Moreover, a space-saving toothed gear transmission having few toothed gear pairs and a high number of load shifting capabilities, in particular with double upshifting and double downshifting capabilities under load, can be achieved in that, in addition to the first transmission constant on the first intermediate shaft, at least a second transmission constant different from it is disposed on the second intermediate shaft and at least one transmission constant can be placed in effective connection with the output shaft through both countershafts. It is possible to start from multiple gear speeds optionally with the first, the second, or both load shifting clutches. It is particularly advantageous that each transmission constant can be effectively connected to each countershaft, so that each toothed gear pair can be placed in effective connection with each transmission constant. Each toothed gear pair can have at least two gear speeds allocated to it, or, with more than two transmission constants, more than two gear speeds can be allocated to it.

An advantageous embodiment for a broad range of applications has, in addition to two transmission constants, three toothed gear pairs for six different forward gear speeds and one toothed gear for at least one reverse gear speed. One toothed gear of the toothed gear pair allocated to the fourth and sixth gear speeds is disposed on the second countershaft, and one toothed gear of the toothed gear pair allocated to the third and fourth gear speeds and one toothed gear of the toothed gear pair allocated to the first and second gear speeds are disposed on the first countershaft.

An advantageous variant also consists of having a one toothed gear of the toothed gear pair allocated to the third and sixth gear speeds disposed on the second countershaft and one toothed gear of the toothed gear pair allocated to the second and fourth [gear speeds] and one toothed gear of the toothed gear pair allocated to the first and second toothed [gear speeds] disposed on the first countershaft. A first gear speed having a high gear ratio can advantageously be achieved, for example for use in an internal combustion engine with a turbocharger, in an internal combustion engine with low power, in an all-terrain vehicle, etc.

The load shifting clutches are advantageously used individually or together for starting as a function of at least one operating parameter. In one embodiment, it is proposed that the difference in rotational speed on at least one, advantageously both load shifting clutches and the power to be transferred be recorded, and that the load shifting clutches be used individually or together to start, depending on the difference in rotational speed and the power to be transferred. If starting is to be done with a high difference in rotational speed with high power, it is advantageous to use both load shifting clutches. If starting is done with a low difference in rotational speed, it is possible to start solely with the first or with the second load shifting clutch, which can be designed differently for different loads. The load shifting clutches can be dimensioned to be particularly inexpensive and light and to be operated with low wear.

Moreover, it is advantageous for the weight of the motor vehicle, including cargo, and/or the slope of a route driven by the vehicle to be recorded, and for the load shifting clutches to be used individually or together for starting depending on the weight and/or slope. When starting on a steep slope and/or with heavy cargo, it is advantageous to use both load shifting clutches for starting.

As the temperature of the load shifting clutch rises, wear generally increases. To reduce wear, in accordance with the invention the temperature on at least one, advantageously on both load shifting clutches is recorded. Depending on the temperature of the load shifting clutches, they are used individually or together for starting. If the temperature of one load shifting clutch rises over a specific value, for example due to frequent starting in traffic at a high ambient temperature, the load shifting clutches can be used alternately or jointly. The heat energy can advantageously be dissipated through both load shifting clutches, an increased temperature in only one load shifting clutch can be avoided, and wear can be reduced.

To achieve the longest possible maintenance intervals, it is proposed that the wear on the load shifting clutches be recorded and that the load shifting clutches be used individually or together for starting as a function of the wear, with the load shifting clutches being used to start in such a way that at least to a certain degree, equal wear occurs in both load shifting clutches. Replacement is not necessary until both load shifting clutches have been mostly worn. Particularly long maintenance intervals can be achieved. Moreover, during maintenance, both load shifting clutches can advantageously be replaced at the same time, saving effort and cost.

To avoid having both load shifting clutches simultaneously become completely worn and simultaneously fail, it is advantageous for only one of the two load shifting clutches to be used for starting after a certain amount of wear. This creates a type of safety buffer, so that after failure of one load shifting clutch a driver can safely proceed to the closest shop using the clutch that has not yet been fully worn. A display advantageously shows the driver that only one load shifting clutch is being used for the starting process. The driver can then adapt his driving practices and get to a shop in sufficient time.

Additional advantages are indicated in the following description of the drawings. The drawings show a sample embodiment of the invention. The description and the claims contain numerous features in combination. Those skilled in the art will also find it beneficial to consider these features individually and to combine them into useful additional combinations.

BRIEF DESCRIPTION OF THE DRAWINGS

The drawings are as follows:

FIG. 6 shows a summary of possible gear changes.

DETAILED DESCRIPTION

Figure 1:
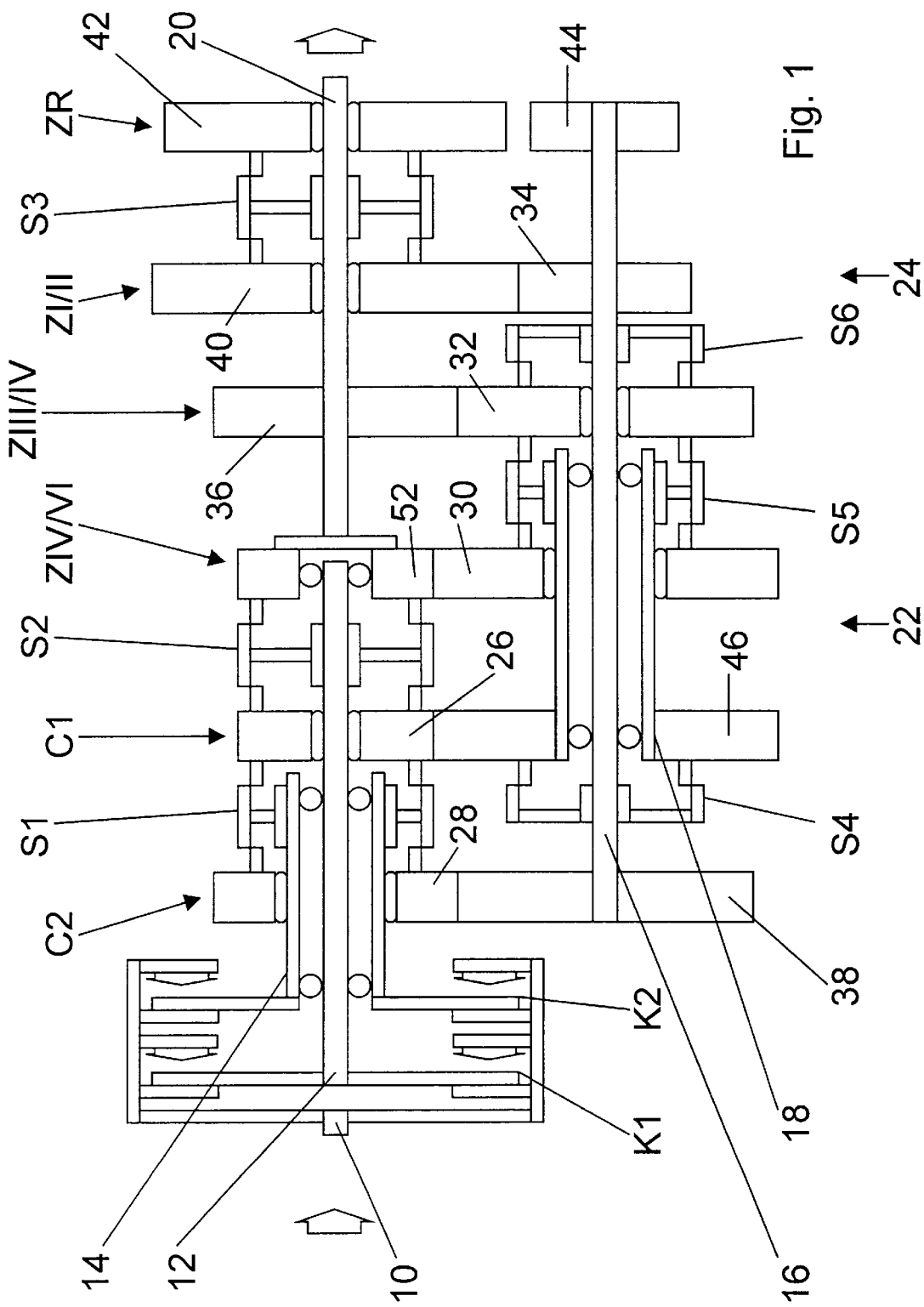
FIG. 1 shows a schematic representation of a toothed gear transmission in neutral position.

FIG. 1 shows a toothed gear transmission in accordance with the invention in which an input shaft 10 is connected to an output shaft 20 through a first partial transmission 22 and a second partial transmission 24, which are disposed parallel to each other in the power flow. Partial transmissions 22, 24 each have a frictionally engaged load shifting K1, K2 and an intermediate shaft 12, 14. The intermediate shafts 12, 14 are disposed concentric to each other and coaxially to input shaft 10, and can each be effectively connected through load shifting clutches K1, K2 to input shaft 10.

First intermediate shaft 12 of first partial transmission 22 can be effectively connected, on the one hand to output shaft 20 by a toothed gear clutch S2, which can be engaged and disengaged to form a direct fifth gear speed V, and on the other hand by toothed gear clutch S2 through a first transmission constant C1 to a countershaft 18 which is constructed as a hollow shaft and which is parallel to output shaft 20.

Countershaft 18 of first partial transmission 22 is connected to output shaft 20 by a toothed gear pair ZIV/VI to form the highest and the second-highest gear speeds IV, VI. Toothed gear pair ZIV/VI has a fixed gear 52 which is connected to output shaft 20 in such a way that it cannot rotate and which meshes with idler gear 30. Idler gear 30 is disposed concentrically on countershaft 18 so that it can rotate, and can be coupled to countershaft 18 by toothed gear clutch S5, which can be engaged and disengaged. Intermediate shaft 12 is supported in fixed gear 56, which can in particular save construction length.

Moreover, countershaft 18 of first partial transmission 22 can be effectively connected to output shaft 20 through a toothed gear pair ZIII/IV to form the third and the fourth gear speeds III, IV. Toothed gear pair ZIII/IV has a fixed wheel 36, which is disposed concentrically on output shaft so that it cannot rotate, and an idler gear 32, which is disposed concentrically so that it can rotate on an additional countershaft 16 parallel to output shaft 20. Idler gear 32 can be coupled to countershaft 18 through engageable and disengageable toothed gear clutch S5, and to countershaft 16 through toothed gear clutch S6.

Second intermediate shaft 14 of second partial transmission 24 is constructed as a hollow shaft and is connected through a second transmission constant C2 to countershaft 16, which passes through countershaft 18 of first partial transmission 22 with play. Second transmission constant C2 has an idler gear 28 which is disposed concentrically so that it can rotate on intermediate shaft 14 and which can be connected through a toothed gear clutch S1 to intermediate shaft 14, and a fixed gear 38 which is connected concentrically to countershaft 16 so that it cannot rotate. Countershaft 16 belonging to second partial transmission 24 is connected to output shaft 20 through toothed gear pair ZIII/IV for the third and fourth gear speeds III, IV, through a toothed gear pair ZI/II for the first and second gear speeds I, II, and through a toothed gear pair ZR for two reverse gear speeds R.

Toothed gear pair ZI/II for first and second gear speeds I, II has an idler gear 40 which is disposed concentrically on output shaft 20 so that it can rotate and which can be coupled to output shaft 20 with toothed gear clutch S3, and a fixed gear 34 disposed concentrically on countershaft 16 so that it cannot rotate.

Toothed gear pair ZR for reverse gear speed R has an idler gear 42 which is disposed concentrically on output shaft 20 so that it can rotate and which can be coupled to output shaft 20 through engageable and disengageable toothed gear clutch S3, and a fixed gear 44 that is connected concentrically with countershaft 16 so that it cannot rotate. A toothed gear for reversing the direction of rotation, not shown in greater detail, is disposed between idler gear 42 and fixed gear 44 of toothed gear pair ZR.

First transmission constant C1 has a fixed gear 46 which is disposed concentrically on countershaft 16 so that it cannot rotate and which meshes with an idler gear 26 disposed concentrically so that it can rotate on intermediate shaft 12 of first partial transmission 22. Idler gear 26 can be connected by the engageable and disengageable toothed wheel clutch S2 to intermediate shaft 12 of first partial transmission 22 and through toothed gear clutch S1 to intermediate shaft 14 of second partial transmission 24. Second load shifting clutch K2 or second intermediate shaft 14 is thereby effectively connectable to both second transmission constant C2 and first transmission constant C1. First transmission constant C1 can optionally be placed in effective connection with the first, the second, or both load shifting clutches K1, K2 by toothed gear clutches S1 and S2.

Moreover, intermediate shaft 14 of second partial transmission 24 can be effectively connected to fixed gear 46 of transmission constant C1 and therefore to countershaft 18 of first partial transmission 22 through second transmission constant C2 by an engageable and disengageable toothed gear clutch S4, and to output shaft 20 through toothed gear pair ZIV/VI allocated to first partial transmission 22. Intermediate shaft 12 can advantageously be effectively connected to countershaft 16 through first transmission constant C1 by engageable and disengageable toothed gear clutch S4, and to output shaft 20 through toothed gear pairs ZIII/IV, ZI/II, ZR allocated to second partial transmission 24. Each transmission constant C1 and C2 can be used to output through each toothed gear pair ZI/II, ZIII/IV, ZIV/VI, ZR to output shaft 20. Transmission constants C1 and C2 are different, so that each toothed gear pair ZI/II, ZIII/IV, ZIV/VI, ZR is allocated to two gear speeds.

Figure 2:
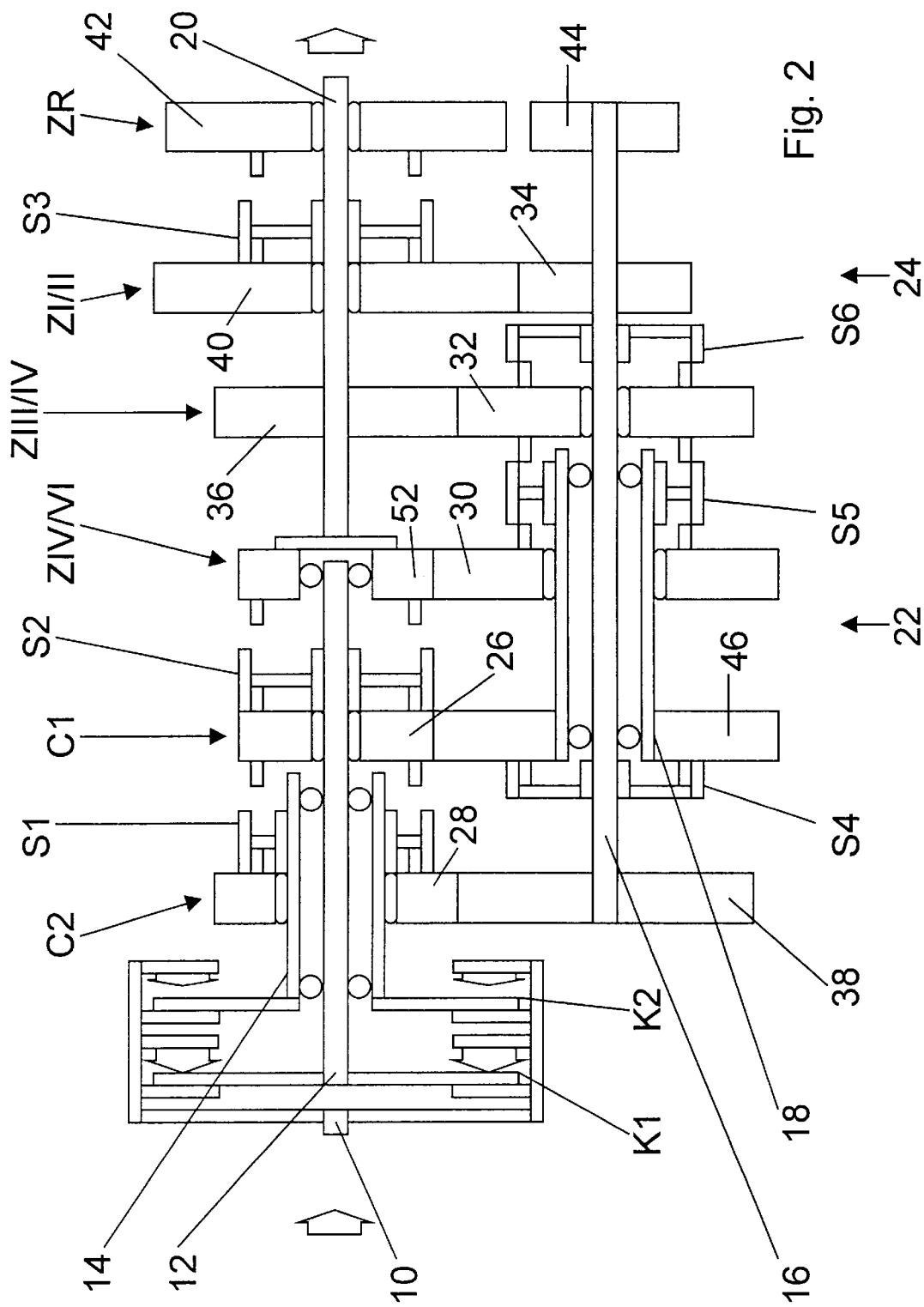
FIG. 2 shows a toothed gear transmission in accordance with FIG. 1 when starting from the first gear speed with a first load shifting clutch.

FIG. 2 shows the toothed gear transmission during the process of starting from first gear speed I with first load shifting clutch K1. Load shifting clutch K1 is closed, toothed gear clutch S2 couples idler gear 26 of first transmission constant C1 to intermediate shaft 12, toothed gear clutch S4 couples transmission constant C1 with countershaft 16, and toothed gear clutch S3 couples idler gear 40 of toothed gear pair ZI/II for first and second gear speeds I, II to output shaft 20. The power flow runs from input shaft 10 through load shifting clutch K1, intermediate shaft 12, toothed gear clutch S2, transmission constant C1, toothed gear clutch S4, countershaft 16, toothed gear pair ZI/II, and through toothed gear clutch S3 to output shaft 20.

Idler gear 28 of second transmission constant C2 is coupled through toothed gear clutch S1 with intermediate shaft 14. Second gear speed II is preselected and can be shifted with particular comfort merely by an overlap control or by closing second load shifting clutch K2 and by opening first load shifting clutch K1 under load.

Figure 3:
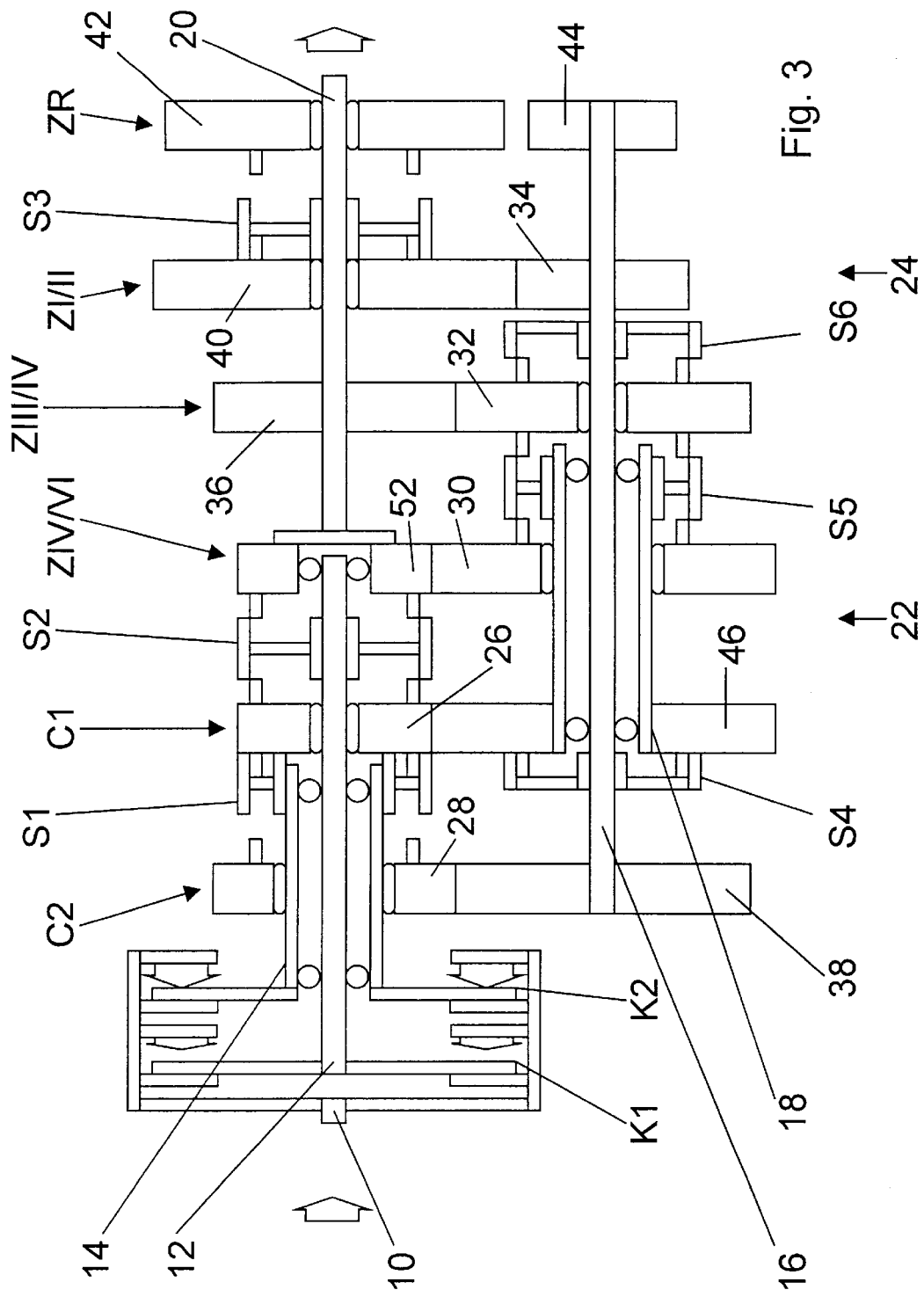
FIG. 3 shows a toothed gear transmission in accordance with FIG. 1 when starting from the first gear speed with the second load shifting clutch.

FIG. 3 shows the toothed gear transmission during the process of starting from first gear speed I with second load shifting clutch K2. Load shifting clutch K2 is closed, toothed gear clutch S1 couples intermediate shaft 14 with idler gear 26 of first transmission constant C1, toothed gear clutch S4 couples transmission constant C1 to countershaft 16, and toothed gear clutch S3 couples idler gear 40 of toothed gear pair ZI/II to output shaft 20. The power flow runs from input shaft 10 through second load shifting clutch K2, intermediate shaft 14, toothed gear clutch S1, transmission constant C1, toothed gear clutch S4, countershaft 16, toothed gear pair ZI/II, and through the toothed gear clutch S3 to output shaft 20.

Figure 4:
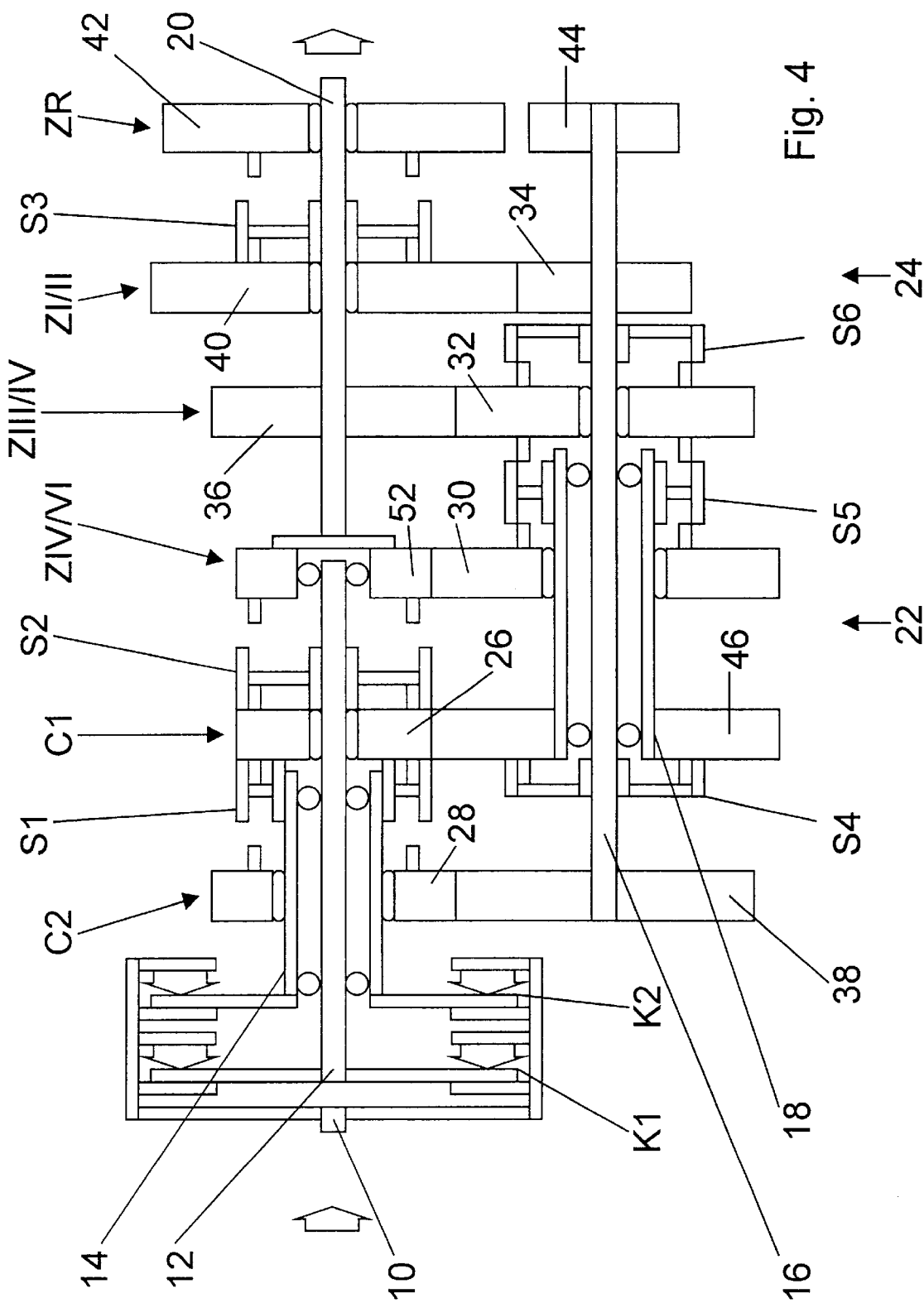
FIG. 4 shows a toothed gear transmission in accordance with FIG. 1 when starting from the first gear speed with both load shifting clutches.

FIG. 4 shows the toothed gear transmission in the process of starting from the first gear speed I with first and second load shifting clutches K1, K2. Load shifting clutches K1, K2 are closed, toothed gear clutch S1 couples intermediate shaft 14, and toothed gear clutch S2 couples intermediate shaft 12 to idler gear 26 of transmission constant C1. Toothed gear clutch S4 couples transmission constant C1 to countershaft 16 and toothed gear clutch S3 couples idler gear 40 of toothed gear pair ZI/II to output shaft 20. The power flow runs from input shaft 10 through load shifting clutches K1, K2, through intermediate shafts 12, 14, through toothed gear clutches S1, S2, transmission constant C1, toothed gear clutch S4, countershaft 16, toothed gear pair ZI/II, and through toothed gear clutch S3 to output shaft 20. If the difference in rotational speed in the load shifting clutches K1, K2 drops to zero, load shifting clutch K2 is opened.

For starting, both load shifting clutches K1 and K2 can be effectively connected to output shaft 20 through the same transmission constant C1 and through the same toothed gear pair ZI/II. As a function of operating parameters, the first and second load shifting clutches K1, K2 can optionally be used individually or together to start from first gear speed I. If second load shifting clutch K2 is used alone for starting from first gear speed I, it is possible to shift into second gear speed II without interruption of tractive force by transferring to load shifting clutch K1, or to shift directly with interruption of tractive force.

Figure 5:
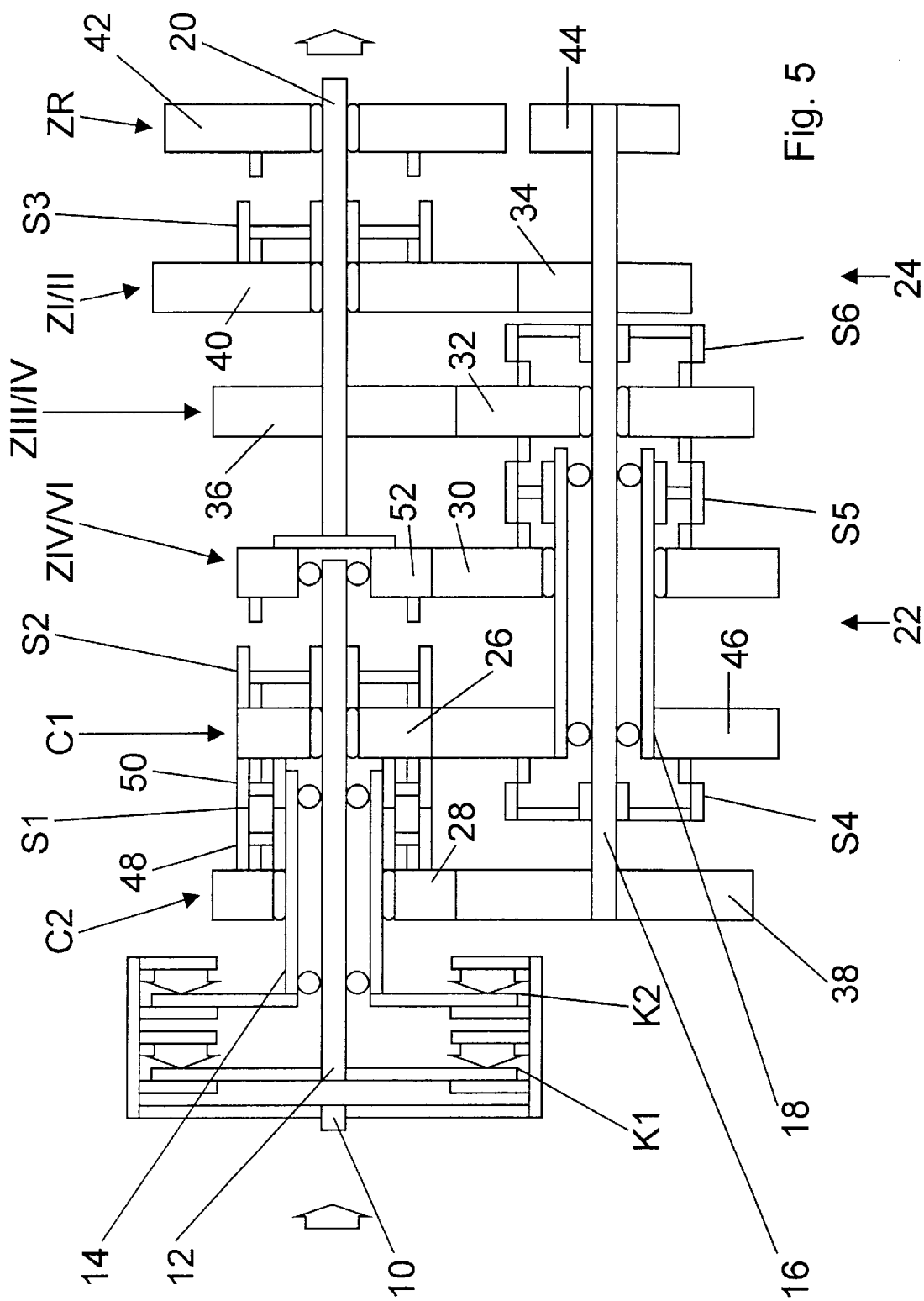
FIG. 5 shows a toothed gear transmission in accordance with FIG. 1 when starting from the second gear speed with both load shifting clutches.

FIG. 5 shows the toothed gear transmission in the process of starting from second gear speed II with both load shifting clutches K1, K2. Both load shifting clutches K1, K2 are closed, toothed gear clutch S2 couples idler gear 26 of first transmission constant C1 to intermediate shaft 12, toothed gear clutch S1 couples idler gear 26 of first transmission constant C1 and idler gear 28 of second transmission constant C2 to intermediate shaft 14. Toothed gear clutch S3 couples idler gear 40 of toothed gear pair ZI/II to output shaft 20. The power flow runs from input shaft 10 through load shifting clutches K1, K2, intermediate shafts 12, 14, toothed gear clutches S1, S2, transmission constant C2, countershaft 16, toothed gear pair ZI/II and through toothed gear clutch S3 to output shaft 20. Toothed gear clutch S1 comprises two parts 48, 50 that are connected together and can slide into each other. Moreover, various constructions are possible that those skilled in the art will recognize as useful, in which the two idler gears 26, 28 of transmission constants C1, C2 can effectively be connected to intermediate shaft 14.

FIG. 6 shows a summary of possible gear changes under load, in each case from a source speed Q to a target speed Z. The possible gear changes are marked with X. The respective shifted toothed gear clutches are listed under GS. If, in addition to a neutral position of the toothed gear clutch, two shifting positions are possible, the coupled transmission constant or the coupled toothed gear pair is specified for each toothed gear clutch. With two transmission constants C1 and C2 and three toothed gear pairs ZI/II, ZIII/IV, ZIV/VI, six different forward gear speeds I, II, III, IV, V, VI can be achieved, in which the first gear speed $I_{1,2}$ occurs twice, third gear speed $III_{1,2}$ occurs twice, and the fourth gear speed $IV_{1,2,3}$ occurs three times.

From gear speeds $I_1$, $III_1$, and V, it is possible to shift with an overlap control from load shifting clutch K1 to K2 sequentially under load respectively into gear speeds II, $IV_1$, VI and vice versa. Moreover, important double upshifts and double downshifts under load are possible, in the form of double downshifting from VI to $IV_2$, from V to $III_2$, and from $IV_2$ to II and double upshifting from II to $IV_2$, from $III_2$ to V, and from $IV_2$ to VI. In addition, further multiple shifts under load are possible, which are marked with X.

Before shifting from fourth gear speed $IV_{1,2,3}$ to a target speed, the fourth gear speed $IV_{1,2,3}$ under load is always selected, from which shifting to target speed under load is possible. The same applies to the third gear speed $III_{1,2}$.

What is claimed is:

1. A toothed gear transmission comprising an input shaft connected to an output shaft by a first and a second partial transmissions, said partial transmissions disposed parallel to each other in the power flow and both having one frictionally engaged load shifting clutch and one intermediate shaft, each intermediate shaft adapted to be effectively connected through its load shifting clutch to the input shaft, and having at least one first transmission constant, wherein the first load shifting clutch is adapted to be placed in effective connection with the output shaft through the at least one first transmission constant and the second load shifting clutch is adapted to be placed in effective connection with the output shaft through the at least one transmission constant, each at a gear ratio of a lowest gear speed for starting.

2. A toothed gear transmission in accordance with claim 1, wherein the first and the second load shifting clutches are adapted to be simultaneously placed in effective connection with the output shaft at the gear ratio of the lowest gear speed.

3. A toothed gear transmission in accordance with claim 1, wherein the at least one transmission constant allocated to the lowest gear speed is adapted to be placed in effective connection with the first and the second load shifting clutches.

4. A toothed gear transmission in accordance with claim 3, wherein both load shifting clutches are adapted to be placed in effective connection with the output shaft through the at least one transmission constant and through a toothed gear pair used for starting.

5. A toothed gear transmission in accordance with claim 1, wherein the first load shifting clutch is adapted to be placed in effective connection with the output shaft through a second transmission constant, and the second load shifting clutch is adapted to be placed in effective connection with the output shaft through the second transmission constant to start at a gear ratio of a second-lowest gear speed.

6. A toothed gear transmission in accordance with claim 1, wherein the first and the second load shifting clutches are adapted to be placed in effective connection with the output shaft simultaneously at the gear ratio of a second-lowest gear speed.

7. A toothed gear transmission in accordance with claim 6, wherein a toothed gear of the at least one first transmission constant is disposed on the first intermediate shaft, and a toothed gear of at least one second transmission constant is disposed on the second intermediate shaft, and the first intermediate shaft is adapted to be placed in effective connection with the output shaft through a shifting component disposed between the toothed gears and through the second transmission constant.

8. A toothed gear transmission in accordance with claim 1, wherein a toothed gear pair is allocated to the lowest gear speed and a second-lowest gear speed.

9. A toothed gear transmission in accordance with claim 1, wherein the intermediate shaft of the first partial transmission is adapted to be placed in effective connection through the at least one first transmission constant with a second countershaft which is parallel to the input shaft and which is adapted to be effectively connected to the output shaft through at least one toothed gear pair allocated to the first partial transmission, and wherein the at least one first transmission constant is adapted to optionally be placed in effective connection with the first, the second, or both load shifting clutches.

10. A toothed gear transmission in accordance with claim 9, wherein the output shaft is adapted to be connected to the intermediate shaft of the first partial transmission by an engageable and disengageable shifting component to form a direct gear speed.

11. A toothed gear transmission in accordance with claim 1, wherein, in addition to the at least one first transmission constant on the first intermediate shaft, at least one second transmission constant, different from the first transmission constant, is disposed on the second intermediate shaft, and at least one of said transmission constants is adapted to be placed in effective connection with the output shaft through a plurality of countershafts.

12. A toothed gear transmission in accordance with claim 11, further comprising a plurality of toothed gear pairs adapted to be placed in effective connection with each transmission constant.

13. A toothed gear transmission in accordance with claim 1, further comprising three toothed gear pairs for six different forward gear speeds and one toothed gear pair for at least one reverse gear speed, wherein a first toothed gear of first toothed gear pair is allocated to the fourth and sixth gear speeds and is disposed on a second countershaft, and a second toothed gear of a second toothed gear pair is allocated to the third and fourth gear speeds, and a third toothed gear of a third toothed gear pair is allocated to the first and second gear speeds and disposed on the first countershaft.

14. A process for shifting a toothed gear transmission, wherein, as a function of at least one operating parameter, a first, a second, or both the first and second load shifting clutches together are used for starting.

15. A process in accordance with claim 14, wherein the difference in rotational speed at at least one load shifting clutch and the power to be transferred are recorded, and the load shifting clutches are used individually or together to start as a function of the difference in rotational speed and the power to be transferred.

16. A process in accordance with claim 14, wherein a weight of the motor vehicle containing the toothed gear transmission, including cargo, and/or the slope of a route driven by the vehicle are recorded and, as a function of the weight and/or slope, the load shifting clutches are used individually or together for starting.

17. A process in accordance with claim 14, wherein a temperature at at least one load shifting clutch is recorded and, as a function of the temperature, the load shifting clutches are used individually or together for starting.

18. A process in accordance with claim 14, wherein wear on at least one load shifting clutch is recorded and, as a function of the wear, the load shifting clutches are used individually or together for starting.

19. A process in accordance with claim 18, wherein the load shifting clutches are used for starting in such a way that both load shifting clutches experience substantially equal wear.

20. A process in accordance with claim 19, wherein from the point when a certain amount of wear is reached, only one of the two load shifting clutches is still used.

21. A process in accordance with claim 14, wherein in case of failure of one load shifting clutch the other load shifting clutch can be used for starting.

* * * * *